(12) United States Patent
Zeilinger et al.

(10) Patent No.: US 7,189,034 B1
(45) Date of Patent: Mar. 13, 2007

(54) DRILL TEMPLATE

(75) Inventors: Brian K. Zeilinger, Janesville, WI (US); Richard R. Popp, Beloit, WI (US)

(73) Assignee: PlayStar, Inc., Janesville, WI (US)

( * ) Notice: Subject to any disclaimer, the term of this patent is extended or adjusted under 35 U.S.C. 154(b) by 0 days.

(21) Appl. No.: 11/294,263

(22) Filed: Dec. 5, 2005

(51) Int. Cl.
*B32B 47/28* (2006.01)

(52) U.S. Cl. .................................. 408/1 R; 408/115 R

(58) Field of Classification Search ................ 408/1 R, 408/3, 97, 103, 115 R, 72 B, 72 R, 115 B, 408/79, 241 B
See application file for complete search history.

(56) References Cited

U.S. PATENT DOCUMENTS

| | | | |
|---|---|---|---|
| 2,211,634 A | | 8/1940 | Baker |
| 2,798,520 A | | 7/1957 | Maskulka et al. |
| 2,915,926 A | * | 12/1959 | Woerner .................. 408/241 R |
| 3,046,816 A | * | 7/1962 | Saha .......................... 408/103 |
| 3,082,025 A | * | 3/1963 | Larson .......................... 403/61 |
| 3,349,652 A | * | 10/1967 | Cromwell ..................... 81/462 |
| 4,257,166 A | | 3/1981 | Barker et al. |
| 4,280,279 A | | 7/1981 | Grundfest |
| 4,280,776 A | * | 7/1981 | Chaconas et al. ......... 408/72 R |
| 4,474,514 A | * | 10/1984 | Jensen ..................... 408/115 R |
| 4,579,485 A | | 4/1986 | Connor et al. |
| 4,752,162 A | | 6/1988 | Groh |
| 4,765,050 A | * | 8/1988 | Espin ......................... 29/426.4 |
| 4,893,970 A | | 1/1990 | Becraft |
| 4,952,101 A | * | 8/1990 | Coombs .................. 408/115 R |
| 5,126,908 A | * | 6/1992 | Casari et al. ................ 360/137 |
| 5,375,949 A | * | 12/1994 | McHenry, Jr. .............. 408/1 R |
| 6,116,826 A | | 9/2000 | Benway |
| 6,220,796 B1 | * | 4/2001 | Chiang ................... 408/115 R |
| 6,244,795 B1 | * | 6/2001 | Fenelon ................... 408/115 R |
| 7,073,990 B2 | * | 7/2006 | Poeckl .................... 408/115 R |

FOREIGN PATENT DOCUMENTS

| | | | | |
|---|---|---|---|---|
| CA | 1261178 A | * | 9/1989 | |
| DE | 4410600 A1 | * | 11/1994 | |
| GB | 2158747 A | * | 11/1985 | |
| WO | WO 9856546 A1 | * | 12/1998 | |
| WO | WO 2005023470 A2 | * | 3/2005 | |

* cited by examiner

*Primary Examiner*—Daniel W. Howell
(74) *Attorney, Agent, or Firm*—Michael Best & Friedrich LLP

(57) ABSTRACT

A drill template that is operable to locate a position for a hole in a member. The member has at least two distinct surfaces and the drill template includes a body having first and second oppositely-facing sides configured for locating a position for a hole to be drilled in the member. A first alignment member on the first side of the body is configured to align with both a first and a second distinct surface of the member to position the body relative to the member. A second alignment member on the second side of the body is configured to align with the first surface of the member but not with the second surface of the member to position the body relative to the member.

23 Claims, 4 Drawing Sheets under the DRILL TEMPLATE

BACKGROUND

The present invention relates to a drill template for locating a position for a hole in a member.

It is known to use a template to quickly and accurately locate a position for a hole to be drilled in a member. The template can be used to quickly locate the position for the hole by aligning the template with the member, then marking the location for the hole. The template can be utilized to minimize the measurements that are taken by a user to locate the position for the hole. Measuring the position for the hole can be time consuming, especially when locating several holes at similar positions on multiple members. Furthermore, the user can make mistakes when measuring the location for the hole. The template can provide consistent results that minimize the chance of the user incorrectly determining the position for the hole.

SUMMARY

The invention provides an improved drill template. In one embodiment, the invention provides a drill template that is operable to locate a position for a hole in a member that has at least two distinct surfaces. The drill template comprises a body that has first and second oppositely-facing sides configured for locating a position for a hole to be drilled in the member. A first alignment member on the first side is configured to align with both a first surface and a second distinct surface of the member to position the body relative to the member. A second alignment member on the second side is configured to align with the first surface of the member by not with the second surface of the member to position the body relative to the member.

In another embodiment the invention provides a method of using a drill template that is operable to locate a position for a hole in a surface of a member. The surface of the member has opposite ends defined by corners of the member. The drill template includes a body that has first and second oppositely-facing sides, a first alignment member on the first side, and a second alignment member on the second side. The method comprises determining a location for the hole in the surface of the member. When the hole is to be located adjacent one of the opposite ends, the first alignment member is aligned with a corner of the member at one of the opposite ends of the surface to locate a position for the hole. When the hole is to be spaced from the opposite ends, the second alignment member is aligned with an edge of the member and spaced from the corners to locate a position for the hole.

Other aspects of the invention will become apparent upon consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
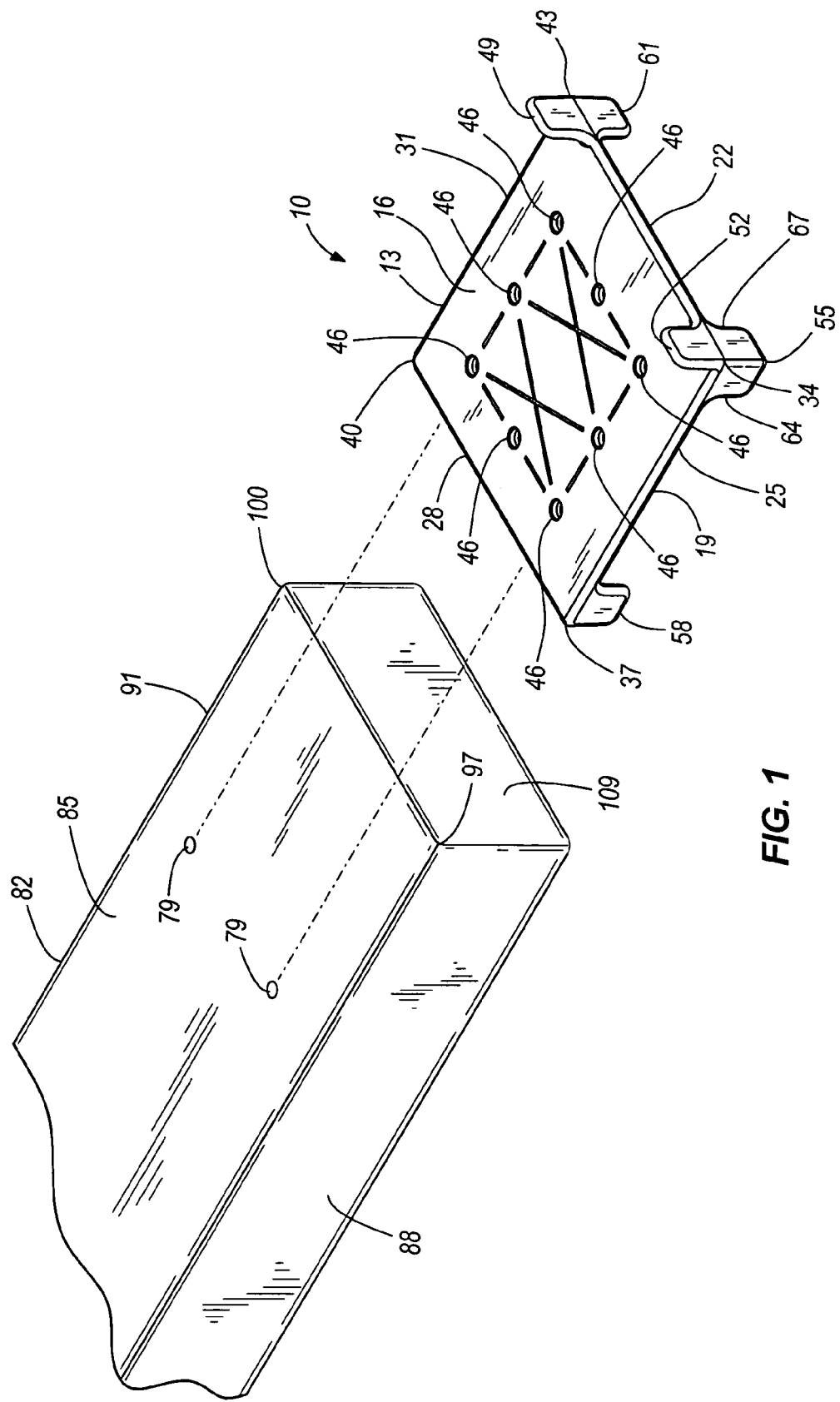
FIG. 1 is a perspective view of a drill template in a first orientation and spaced from a member.
Figure 2:
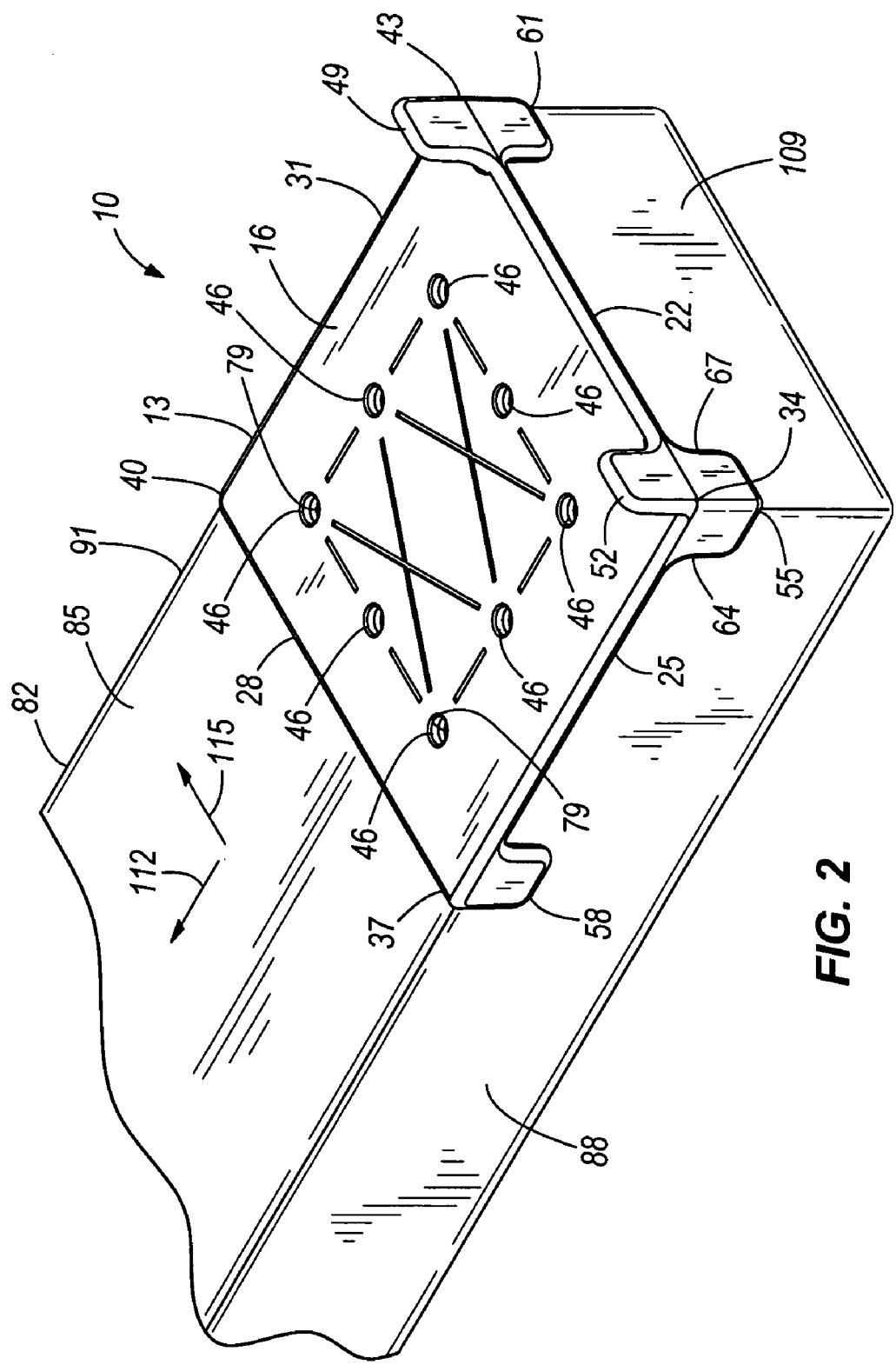
FIG. 2 is a perspective view of the drill template in the first orientation and aligned with the member.
Figure 3:
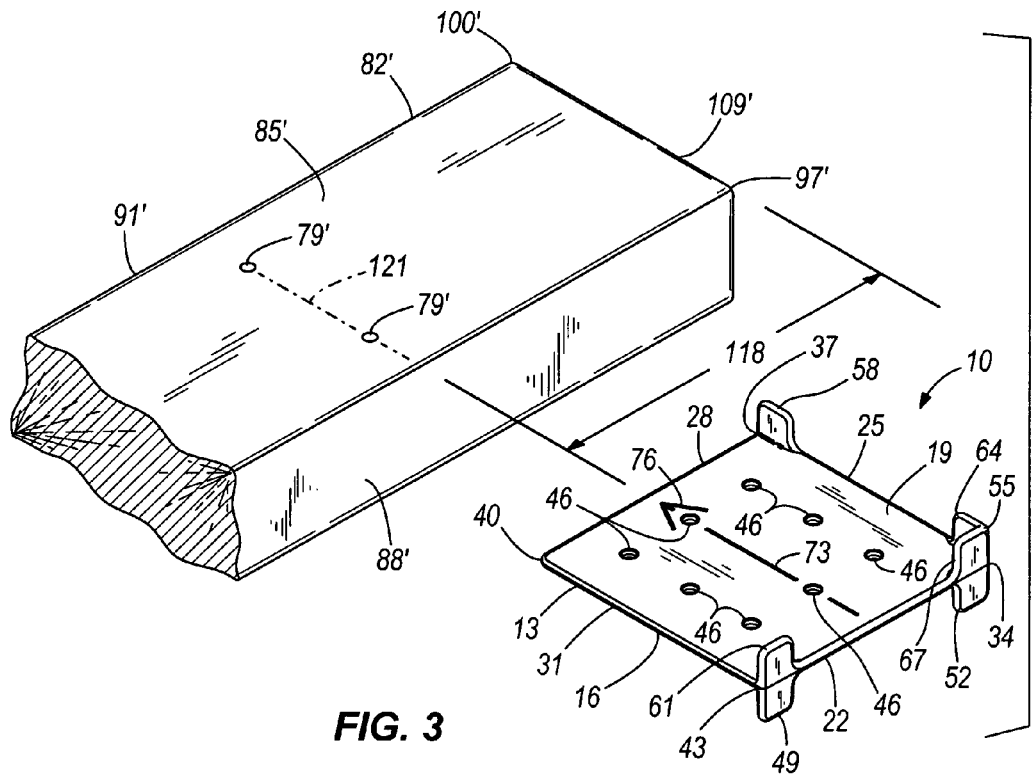
FIG. 3 is a perspective view of the drill template in a second orientation and spaced from a member.
Figure 4:
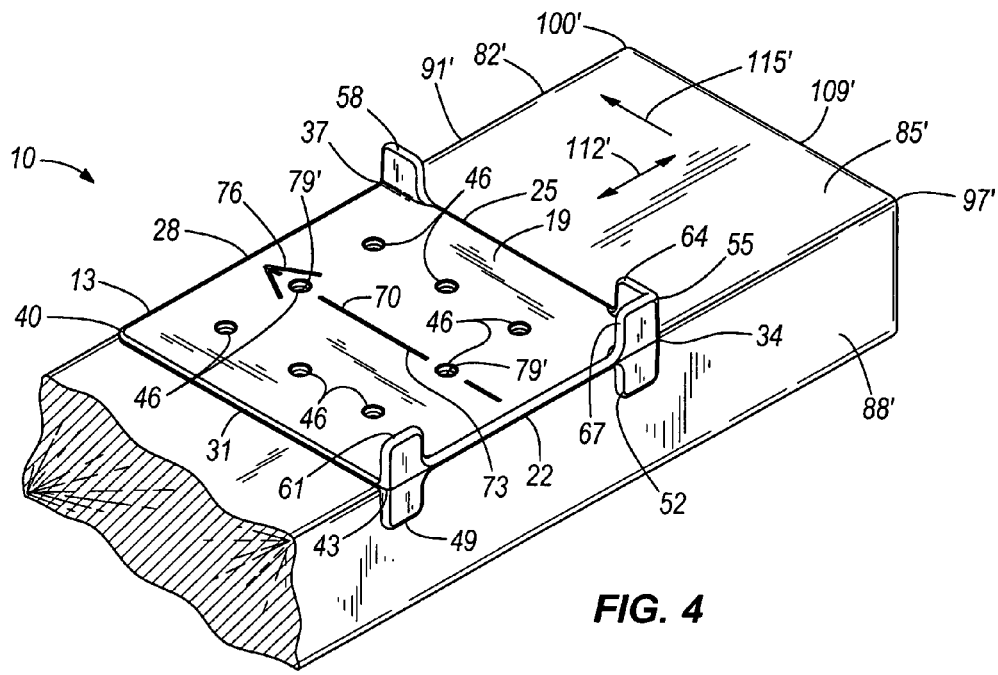
FIG. 4 is a perspective view of the drill template in the second orientation and aligned with the member of FIG. 3.

FIGS. 1–4 illustrate a drill template 10 including a body 13 with a first side 16 (see FIGS. 1 and 2) and an oppositely facing second side 19 (see FIGS. 3 and 4). The illustrated body 13 is a square, approximately 3½ inches by 3½ inches, and the body 13 is generally planar and thin in cross section. Edges 22, 25, 28, 31 of the body define corners 34, 37, 40, 43. The illustrated body 13 is only one possible construction, and it should be understood that the body 13 can be any suitable shape, such as circular, rectangular, or triangular and can be any suitable size. The body 13 can be made from plastic or any suitable material, such as steel, aluminum, wood, or composite. The body 13 can be formed by molding, stamping, casting, forging, cutting, or any suitable forming technique. The illustrated body 13 is molded plastic.

A plurality of apertures 46 extend through the body 13. While the illustrated apertures 46 are 3/16 inch holes, it should be understood that the apertures 46 can be any suitable shape and size. In one construction, the apertures 46 are integrally formed with the body 13 when the body 13 is molded. In other constructions, the apertures 46 can be formed after the body 13 is formed by drilling, stamping, or punching. The apertures 46 are located on the body 13 in an arrangement specific to the particular application for which the drill template 10 is designed. Therefore, the location, as well as the number of the apertures 46 on the body can vary.

Referring to FIG. 1, the first side 16 of the body 13 includes an alignment member 49 located adjacent to the corner 43 and an alignment member 52 located adjacent to the corner 34. While the illustrated alignment member 49 is adjacent to the corner 43 and the illustrated alignment member 52 is adjacent the corner 34, in other constructions the alignment members 49, 52 can be located at any position along the edge 22 such that the alignment members 49, 52 are not adjacent the corners 34, 43. In yet other constructions, the alignment members 49, 52 can be consolidated into a single alignment member with no space therebetween.

The illustrated alignment members 49, 52 are projections that extend outwardly from and substantially normal to the body 13, are generally planar and are orientated generally parallel to each other. While the illustrated alignment members 49, 52 are projections, it should be understood that the alignment members 49, 52 can be any suitable alignment member, such as a tab, marked or embossed lines, other markings or apertures. The illustrated alignment members 49, 52 are also generally flush with the edge 22. In an alternative construction, the edge 22 can extend beyond the alignment members 49, 52, such that the alignment members 49, 52 are not generally flush with the edge 22.

Referring to FIG. 3, the second side 19 of the body 13 includes alignment members 55, 58, 61. The alignment members 55, 58, 61 are projections that extend outwardly from and substantially normal to the body 13. While the illustrated alignment members 55, 58, 61 are projections, it should be understood that the alignment members 55, 58, 61 can be any suitable alignment member, such as tabs, marked or embossed lines, other markings or apertures. The illustrated alignment members 55, 58, 61 are generally flush with the respective edges 22, 25. In an alternative construction, the edges 22, 25 may extend beyond the alignment members 55, 58, 61, such that the alignment members 55, 58, 61 are not generally flush with the respective edges 22, 25.

The illustrated alignment member 55 is located adjacent the corner 34 and includes two portions 64, 67. The first portion 64 is parallel with the edge 25 and the second portion 67 is parallel with the edge 22. The two portions 64, 67 are coupled or intersect to form substantially a 90 degree angle therebetween. The illustrated alignment member 58 is generally planar, is located adjacent the corner 37 and is parallel with the edge 25. The illustrated alignment member 61 is generally planar, is located adjacent the corner 43 and is parallel with the edge 22, such that the alignment members 58, 61 are orientated generally normal to each other. While the illustrated alignment members 58, 61 are located adjacent the respective corners 37, 43, it should be understood that the alignment member 58 can be located anywhere along the edge 25 and the alignment member 61 can be located anywhere along the edge 22. In one construction, the second side 19 may only include the alignment members 58 and 61. In other constructions, the second side 19 may only include the alignment member 55, or the alignment member 55 and only one of either the alignment members 58 or 61.

An indicia 70 is located on the second side 19 of the body 13. The illustrated indicia 70 includes a line 73 with an arrowhead 76, but may include any suitable marking or aperture. The illustrated line 73 defines an axis that extends through one or more of the apertures 46. The purpose of the indicia 70 will be discussed further below.

In one construction, the alignment members 49, 52, 55, 58, 61 and the indicia member 70 can be integrally formed with the body 13 during a stamping or molding process. In such a construction, the alignment members 49, 52, 55, 58, 61 and the body 13 can be integrally molded from plastic or formed from metal as a single piece. In other constructions, the alignment members 49, 52, 55, 58, 61 can be separate pieces coupled to the body 13, and can be formed from any suitable material, such as wood, steel, plastic, aluminum or composite.

Referring to FIG. 1, the drill template 10, in a first orientation, is configured to locate positions for holes 79 to be drilled in a member 82. The illustrated member 82 includes surfaces 85, 88, 91 that have ends defining corners 97, 100. The corners 97, 100 partially define an end surface 109 of the member 82. The member 82 also includes an opposite end surface that is similarly defined in part by the ends of the surfaces 85, 88, 91. While the illustrated member 82 is a standard 2 inch×4 inch wood board, it should be understood that the member 82 can be formed from any suitable material in any suitable dimension. For example, in other constructions, the member may be steel, aluminum, composite or plastic member of varying size.

Referring to FIG. 2, when the positions for the holes 79 are to be located adjacent the end surface 109, the drill template 10 is placed on the member 82 in the first orientation, such that the second side 19 of the drill template 10 directly faces and engages with the surface 85 of the member 82. The alignment member 58 is aligned with the surface 88 of the member 82 and the alignment member 61 is aligned with the end surface 109 of the frame member 82. The alignment member 55 is configured to receive and align with the corner 97 such that the first portion 64 aligns with and engages the surface 88 and the second portion 67 aligns with and engages the surface 109. When the drill template 10 is in the position illustrated in FIG. 2, the alignment members 55, 58, 61 prevent movement of the drill template 10 in the direction indicated by the arrows 112 and 115. This enables the user to accurately and intuitively locate the position for the holes 79 relative to the member 82. A marking device, such a pencil, pen, or a sharp object can then be inserted through any number of the apertures 46 to mark the member 82 to locate the position of the holes 79 that will be drilled in the member 82. The number of holes 79 that are located depends on the particular application. In one application only one hole 79 may be marked, and in other applications, several holes 79 can be marked. After the holes 79 are marked, the drill template can be removed and the holes 79 are drilled into the member 82. Alternatively, the drill template 10 could be left in place, as illustrated in FIG. 2, and used as a guide to drill the holes 79.

Referring to FIG. 3, in a second orientation, the drill template 10 is configured to locate positions for holes 79' in a member 82'. The illustrated member includes surfaces 85', 88', 91' that have ends defining corners 97', 100'. The corners 97', 100' at least partially define an end surface 109' of the member 82'. The member 82' also includes an opposite end surface that is similarly defined in part by the ends of the surfaces 85', 88', 91'. While the illustrated member 82' is a standard 2 inch×4 inch wood board, it should be understood that the member 82' can be formed from any suitable material in any suitable dimension. For example, in other constructions, the member may be steel, aluminum, composite or plastic of varying size. While the illustrated member 82' is substantially similar to the member 82 of FIGS. 1 and 2, it should be understood that the member 82' could be different from the member 82.

As illustrated in FIGS. 3 and 4, when the positions for the holes 79' are to be spaced from the end surface 109', the drill template 10 is placed on the member 82' in the second orientation. In the second orientation, the drill template 10 is configured to locate the positions for the holes 79' at any distance 118 from the end surface 109' of the member 82'. To locate the desired positions for the holes 79', the desired distance 118 is measured from the end surface 109' and a mark 121 is made on the surface 85' to locate the positions for the holes 79' with respect to the end surface 109'. Then, the drill template 10 is placed on the member 82' such that the first side 16 of the drill template 10 directly faces and engages with the surface 85' of the member 82'. The alignment members 49 and 52 are aligned with the surface 88, which defines an edge of the member 82. As illustrated in FIG. 3, the arrowhead 76 can be used to generally align the indicia 70 with the mark 121 prior to engaging the drill template 10 with the surface 85'. Then, when the drill template 10 is in the position as illustrated in FIG. 4, the drill template 10 can be moved in the direction indicated by the arrows 112' to view the mark 121 through one of the apertures 46 to generally align the line 73 of the indicia 70 with the mark 121.

With the drill template 10 in the second orientation as illustrated in FIG. 4, the alignment members 49 and 52 prevent movement of the drill template further in the direction indicated by the arrow 115', but the drill template 10 can still be moved (e.g., sliding movement along the surface 85') in the direction indicated by the arrows 112'. This enables the user to move the drill template 10 along the surface 85' while still maintaining the alignment provided by the engagement of the alignment members 49 and 52 with the surface 88'. The marking device can then be inserted through any number of the apertures 46 to locate the positions of the holes 79' that will be drilled in the member 82'. The number of holes that are located can depend on the particular application of the drill template 10 and it should be understood that any number of holes can be located.

After the positions for the holes 79' are marked, the drill template 10 can be removed from the member 82' and the holes 79' are drilled in the member 82'. Alternatively, the drill template 10 could be left in place, as illustrated in FIG. 4, and used as a guide to drill the holes 79'.

Figure 5:
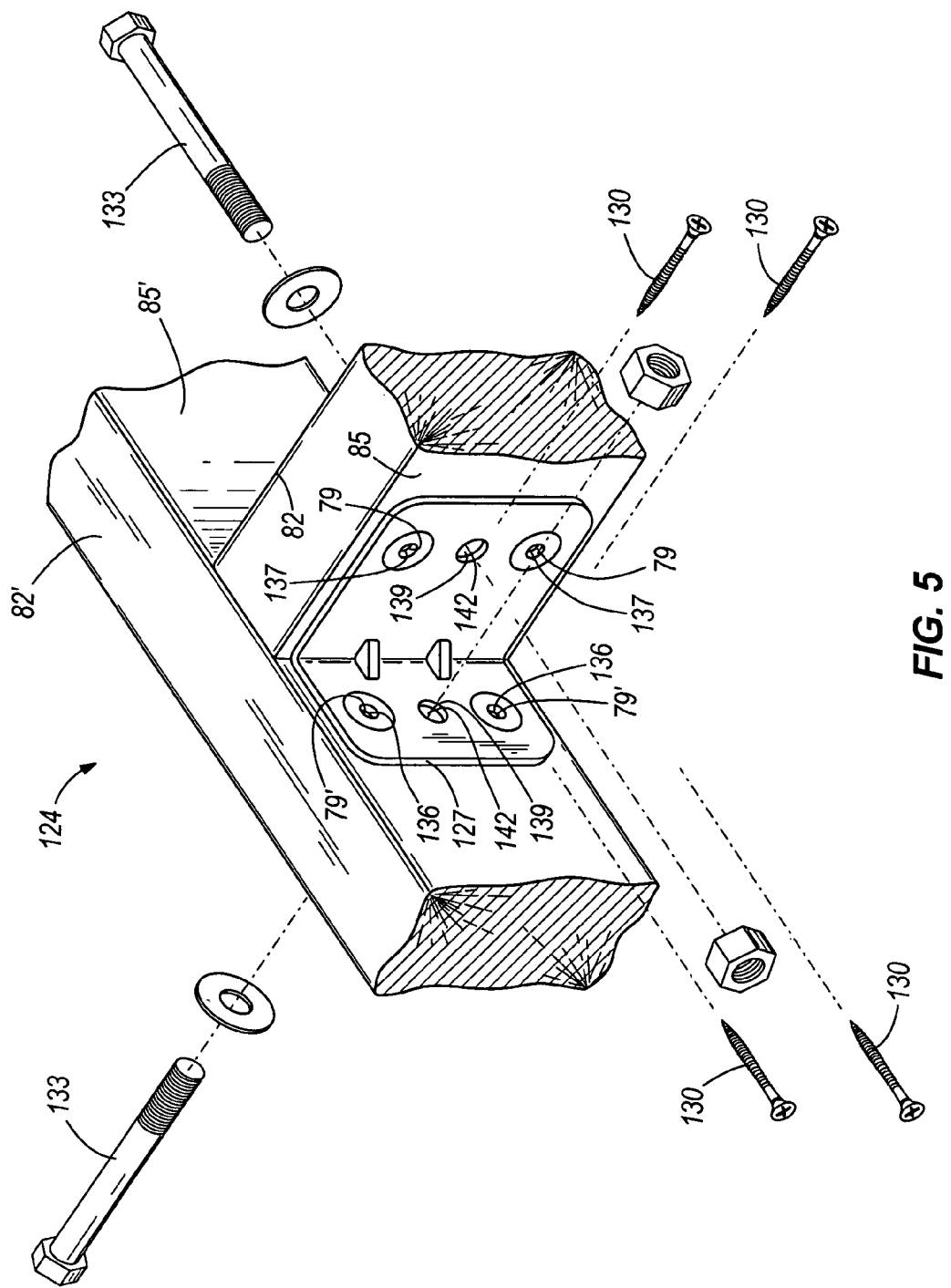
FIG. 5 illustrates an assembly formed from the two members of FIGS. 1–4.

FIG. 5 illustrates an assembly 124 that can be formed using the drill template 10 and the members 82 and 82' of FIGS. 1–4. The assembly 124 includes the frame members 82, 82', a bracket 127, a plurality of first fasteners 130 (e.g., screws) and a plurality of second fasteners 133 (e.g., bolts). The illustrated bracket 127 includes bracket apertures 136, 137, and 139. The bracket apertures 136 and 137 are configured to receive the first fasteners 130 and the bracket apertures 139 are configured to receive the second fasteners 133.

With continued reference to FIG. 5, the assembly 124 is formed by placing bracket 127 on the surface 85' of the frame member 82' such that the bracket apertures 136 generally align with the holes 79' in the member 82'. The holes 79' were located using the drill template 10 in the second orientation. The bracket apertures 137 are generally aligned with the holes 79 in the member 82. The holes 79 were located using the drill template 10 in the first orientation. While the illustrated holes 79 and 79' are blind holes that are drilled about 1 inch into the respective members 82 and 82', in other constructions the holes 79 and 79' can be through holes. The holes 79, 79' are drilled prior to inserting the first fasteners 130 into the members 82 and 82' to substantially prevent cracking of the members 82 and 82' when the first fasteners 130 are inserted into the members 82 and 82'. The first fasteners 130 can then be inserted through the bracket apertures 136, 137 and into the holes 79, 79' to couple the bracket 127 to the members 82 and 82', thereby interconnecting the members 82 and 82'. Additionally, the bracket apertures 139 can be used as a guide to drill holes 142 that receive the second fasteners 133. The second fasteners 133 can then be inserted through the bracket apertures 139 and into the holes 142 to provide further support for coupling the bracket 127 to the members 82 and 82'. In other constructions, the drill template 10 can be used to locate the positions for the holes 79 and 79' and then the bracket apertures 137, 136 can be used as guides to drill the respective holes 79, 79'. In yet other constructions, the drill template 10 can be used to locate the positions for the holes 79, 79' and 142.

FIGS. 1–5 illustrate one application of the drill template 10. In such an application, the drill template 10 can be included in a children's playstation kit, such as the playstation kit described in U.S. patent application Ser. No. 11/232,617 filed on Sep. 22, 2005, the entire contents of which are incorporated herein by reference. The drill template 10 can be included with such a playstation kit, along with instructions, to guide a user to locate positions of holes in members used to form various assemblies, such as the assembly 124 illustrated in FIG. 5. However, it should be understood that this is just one application of the drill template 10. The drill template 10 can be utilized in any application to locate a position for a hole to be drilled in a member.

Thus, the invention provides, among other things, a reversible drill template including two oppositely-facing sides each configured for accurately and intuitively locating a position for a hole to be drilled in a member.

Various features and advantages of the invention are set forth in the following claims.

What is claimed is:

1. A drill template operable to locate a position for a hole in a member, the member having at least two distinct surfaces, the drill template comprising:
   a body having first and second oppositely-facing sides configured for locating a position for a hole to be drilled in the member;
   a first alignment member on the first side, the first alignment member configured to align with both a first surface and a second distinct surface of the member to position the body relative to the member; and
   a second alignment member on the second side, the second alignment member configured to align with the first surface of the member but not with the second surface of the member to position the body relative to the member.

2. The drill template of claim 1, wherein the first and second distinct surfaces of the member form a corner of the member, and wherein the first alignment member includes a first projection extending from the first side that forms substantially a 90 degree angle configured to receive the corner of the member.

3. The drill template of claim 2, wherein the first alignment member further includes second and third projections spaced from the first projection and oriented generally normal to one another.

4. The drill template of claim 3, wherein the body includes four corners, and wherein each of the first, second, and third projections are located at a different corner.

5. The drill template of claim 1, wherein the second alignment member includes a first projection extending from the second side.

6. The drill template of claim 5, wherein the second alignment member further includes a second projection extending from the second side and oriented generally parallel to the first projection.

7. The drill template of claim 6, wherein the body includes four corners, and wherein the first and second projections are located at adjacent corners.

8. The drill template of claim 1, wherein the alignment members are integrally formed with the body.

9. The drill template of claim 8, wherein the alignment members and the body are molded from plastic.

10. The drill template of claim 1, wherein the first side of the body includes an indicia configured to align the body with a marking on the member.

11. The drill template of claim 1, wherein the first alignment member is configured to immovably locate the body relative to the member when the first alignment member is aligned with both the first and second surfaces of the member, and wherein the second alignment member is configured to permit movement of the body along the member when the second alignment member is aligned with the first surface of the member.

12. The drill template of claim 1, wherein the body further includes a plurality of apertures extending therethrough for locating the position of the hole to be drilled in the member.

13. A reversible drill template comprising:
- a body having first and second oppositely-facing sides configured for locating a position for a hole to be drilled in a member;
- a first alignment projection extending from the first side of the body, the first alignment projection forming substantially a 90 degree angle to receive a corner of the member; and
- a second alignment projection extending from the second side of the body, the second alignment projection being substantially planar to engage only a single surface of the member.

14. The reversible drill template of claim 13, further comprising third and fourth alignment projections extending from the first side of the body, spaced from the first alignment projection, and orientated generally normal to one another.

15. The reversible drill template of claim 14, wherein the body includes four corners, and wherein each of the first, third, and fourth alignment projections are located at a different corner.

16. The reversible drill template of claim 13, further comprising a third alignment projection extending from the second side of the body and orientated generally parallel to the second alignment projection.

17. The reversible drill template of claim 16, wherein the body includes four corners, and wherein the second and third alignment projections are located at adjacent corners.

18. The reversible drill template of claim 13, wherein the alignment projections are integrally formed with the body.

19. The reversible drill template of claim 18, wherein the alignment members and the body are molded from plastic.

20. The reversible drill template of claim 13, wherein the first side of the body includes an indicia configured to align the body with a marking on the member.

21. A method of using a drill template operable to locate a position for a hole in a surface of a member, the surface of the member having opposite ends defined by corners of the member, the drill template including a body having first and second oppositely-facing sides, a first alignment member on the first side, and a second alignment member on the second side, the method comprising:
- determining a location for the hole in the surface of the member;
- when the hole is to be located adjacent one of the opposite ends, aligning the first alignment member with a corner of the member at one of the opposite ends of the surface to locate a position for the hole; and
- when the hole is to be spaced from the opposite ends, aligning the second alignment member with an edge of the member and spaced from the corners to locate a position for the hole.

22. The method of using a drill template of claim 21, wherein the first alignment member includes a projection extending from the first side that forms substantially a 90 degree angle that receives the corner of the member.

23. The method of using a drill template of claim 21, further comprising:
- when the hole is to be spaced from the opposite ends, aligning an indicia on the first side with a marking on the member to locate the position for the hole.

* * * * *